United States Patent
Garrigues et al.

(10) Patent No.: US 6,539,436 B2
(45) Date of Patent: *Mar. 25, 2003

(54) MANAGEMENT OF INTERRUPTIONS IN A COMPUTER PLATFORM

(75) Inventors: Philippe Garrigues, Montbonnot (FR); Zoltan Menyhart, Meylan (FR)

(73) Assignee: Bull S.A., Louveciennes (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/402,394
(22) PCT Filed: Feb. 1, 1999
(86) PCT No.: PCT/FR99/00199
  § 371 (c)(1),
  (2), (4) Date: Oct. 5, 1999
(87) PCT Pub. No.: WO99/40513
  PCT Pub. Date: Aug. 12, 1999

(65) Prior Publication Data
  US 2002/0032821 A1 Mar. 14, 2002

(30) Foreign Application Priority Data
  Feb. 5, 1998 (FR) .............................. 98 01363

(51) Int. Cl.[7] .................................................. G06F 9/00
(52) U.S. Cl. ...................................................... 709/319
(58) Field of Search ...................... 709/106, 310–332; 717/11

(56) References Cited

U.S. PATENT DOCUMENTS

| | | | |
|---|---|---|---|
| 5,515,538 A | * | 5/1996 | Kleiman ..................... 709/103 |
| 5,553,293 A | | 9/1996 | Andrews et al. |
| 5,752,031 A | * | 5/1998 | Cutler et al. ................. 709/103 |
| 5,815,707 A | * | 9/1998 | Krause et al. |
| 5,913,058 A | * | 6/1999 | Bonola ........................... 713/2 |
| 6,047,323 A | * | 4/2000 | Krause ........................ 709/227 |
| 6,349,355 B1 | * | 2/2002 | Draves et al. ............... 711/203 |

FOREIGN PATENT DOCUMENTS

WO    WO92 03783 A    3/1992

OTHER PUBLICATIONS

M. Welsh, "Implementing Loadable Kernel Modules for Linux" Dr. Dobb's Journal, vol. 20, No. 5, May 1995, p. 18–20, 22, 24, 96 XP002084853, Redwood City, US, See p. 18, left hand col., par. 2—p. 19, left hand col., par. 3.

"Weakening the Linux Kernel", Phrack Magazine, vol. 8, No. 52, Jan. 26, 1998, pp. 1–15, OP002084854, http://www.phrack.com available on Internet URL:http//www.phrack.com, Nov. 17, 1998 See p. 2, par. 1; see p. 4, par. 1–par. 4.

* cited by examiner

Primary Examiner—Paul R. Myers
(74) Attorney, Agent, or Firm—Edward J. Kondracki; Miles & Stockbridge P.C.

(57) ABSTRACT

In a computer platform (PF) comprising at least one unit (M1, M2), each including at least one respective processor (PRO1–PRO2, PRO3–PRO5) and at least one respective interrupt controller (CI1, CI2), and an operating system (SE) including a basic kernel (NOY) for creating extension modules external to said basic kernel, at least one interrupt managing extension module (MEX1, MEX2) external to the basic kernel (NOY) is created in order to relieve the basic kernel of the management of interruptions.

9 Claims, 1 Drawing Sheet

MANAGEMENT OF INTERRUPTIONS IN A COMPUTER PLATFORM

TECHNICAL FIELD

The invention relates to the management of interruptions in a computer platform. The platform (also called a machine or node) to which the invention applies comprises at least one unit (also called a module). A platform of the NUMA (Non-Uniform Memory Access) type is particularly well suited to the invention and will therefore be used as an example in the description. This platform comprises a plurality of units. In this type of platform, the units are connected to one another. A unit comprises at least one processor. This platform comprises an operating system common to all the units and includes what one skilled in the art most often calls a "kernel." The kernel handles a certain number of basic functions. The two main functions of the kernel are storage management and task management.

In the invention, the operating system offers the capability to create extension modules external to the kernel, such as extension kernels. Therefore, the system has a basic kernel and extension kernels associated with peripheral drivers. An operating system of the UNIX (registered trademark) "modern version" type is entirely suitable in the present case.

The subjects of the invention are a process for managing interruptions in a computer platform, and a computer platform for implementing the process.

PRIOR ART

By definition, in a computer platform, the management of tasks by the kernel of the operating system includes the handling and processing of interruptions. The management of interruptions depends on the number and the types of peripherals present in the platform. The interruptions are associated with peripheral drivers. Interrupt management is included in the kernel of the operating system. By definition, the kernel is a source program written in a high-level language and is therefore subject, before its actual use, to a compilation. A compiling program designates a piece of software that translates the program in its entirety and then runs it.

The big problem is the close link that exists between the management of the interruptions and the kernel of the operating system. The compilation of the kernel sets a configuration state of the platform. The result is that a compilation sets a maximum number of interruptions that can be handled by the operating system. In the description, the term configuration designates the composition of a unit, i.e., the capacity of the memory, the types of disk readers, the capacity of the hard drive, the type of printer, etc. The term configuration also includes the number of units present in the platform.

The compilation of the kernel therefore has the serious drawback of limiting the total number of interruptions. This limitation is an impediment to the use of certain "large-scale" configurations that evolve very rapidly. In fact, the set state of the system and of the number of interruptions prevents a system from evolving. The addition or deletion of units in the platform becomes problematic.

Another problem is that a simple modification of the hardware configuration involves a modification of the interrupt management and hence of the source program in the kernel. This modification of the program involves a complete recompilation of the basic kernel. As is known to one skilled in the art, a recompilation of the kernel of the operating system is extremely costly in terms of money.

A recompilation is also costly in terms of time in the sense that it involves completely re-enabling the operating system/platform pair. In fact, after the recompilation, the kernel of the operating system may not function or not systematically correspond to a platform. A new version of an operating system in a platform must undergo series of tests in all the platforms subjected to an operating system change.

One solution provided by the prior art for solving the problem of the compilation and the drawbacks it entails consists in that the kernels are generally sold compiled with a maximum number of peripheral resource drivers, in order to be compatible with a majority of types of peripheral resources. To a certain extent, all the configurations possible in a platform are provided for. This anticipatory aspect has the serious consequence of unnecessarily wasting memory space for "smallscale" configurations. For example, an interrupt management system can provide for a number of interruptions on the order of one hundred thousand, while a system with a small-scale configuration requires only about ten interruptions.

Another big problem is the loss of performance in the work of the processors in a platform as a result of the constant evolution of the platforms. A platform of the NUMA type is generally constituted by several units connected to one another through a bus. The various units therefore communicate with one another through only one bus, called the system bus. A unit includes at least one processor surrounded by hardware elements such as memories, peripheral drivers, etc. The current trend is to increase the number of units in a platform. The data traffic from one unit to another is becoming greater and greater, and the bus that allows communication between the units is comparable to a bottleneck. Added to this data transfer is the management of interruptions. In this type of system with several units, the management of interruptions takes place at the global level of the system. Increasing the number of units in a platform makes it difficult to manage interruptions. In fact, in this type of multi-unit system, it is known to one skilled in the art that the access time by a processor to the memory varies depending on the location of the data accessed. For a given processor, accesses to a part of local memory, physically located in the same unit as the processor, are distinguished from accesses to a part of remote memory, physically located in one or more units other than the one in which the processor is located. A processor performs better when the hardware elements constituting the unit on which it runs are close to it in terms of distance.

THE INVENTION

A first object of the invention is to provide an interrupt management that is adaptable to platforms whose configuration is constantly evolving, and thus not to impose a recompilation of the basic kernel of the operating system following a modification of the configuration of the platform.

A second object is to create an interface compatible with the existing platforms. The existing platforms could thus retain their basic kernels and a fortiori their own interrupt management systems.

A third object of the invention is to provide an interrupt management that improves the performance of the processors.

A fourth object is to considerably reduce the cost in terms of money and time caused by the modification of the configuration of a platform.

To this end, the subject of the invention is a process for managing interruptions in a computer platform comprising at least one unit including at least one processor and at least one interrupt controller, and an operating system including a basic kernel that makes it possible to create extension modules external to said basic kernel, characterized in that it consists of creating at least one interrupt managing extension module external to the basic kernel in order to relieve the basic kernel of the management of interruptions.

The result is a computer platform comprising at least one unit including at least one processor and at least one interrupt controller, said platform including an operating system that makes it possible to create extension modules and interrupt lines that connect the resources to the interrupt controllers, characterized in that it comprises an interrupt managing software extension module for implementing the process.

The invention will be better understood with the reading of the following description given as an example and formulated in reference to the attached drawings.

IN THE DRAWINGS

To simplify the description, in the drawings the same elements have the same references.

Figure 1:
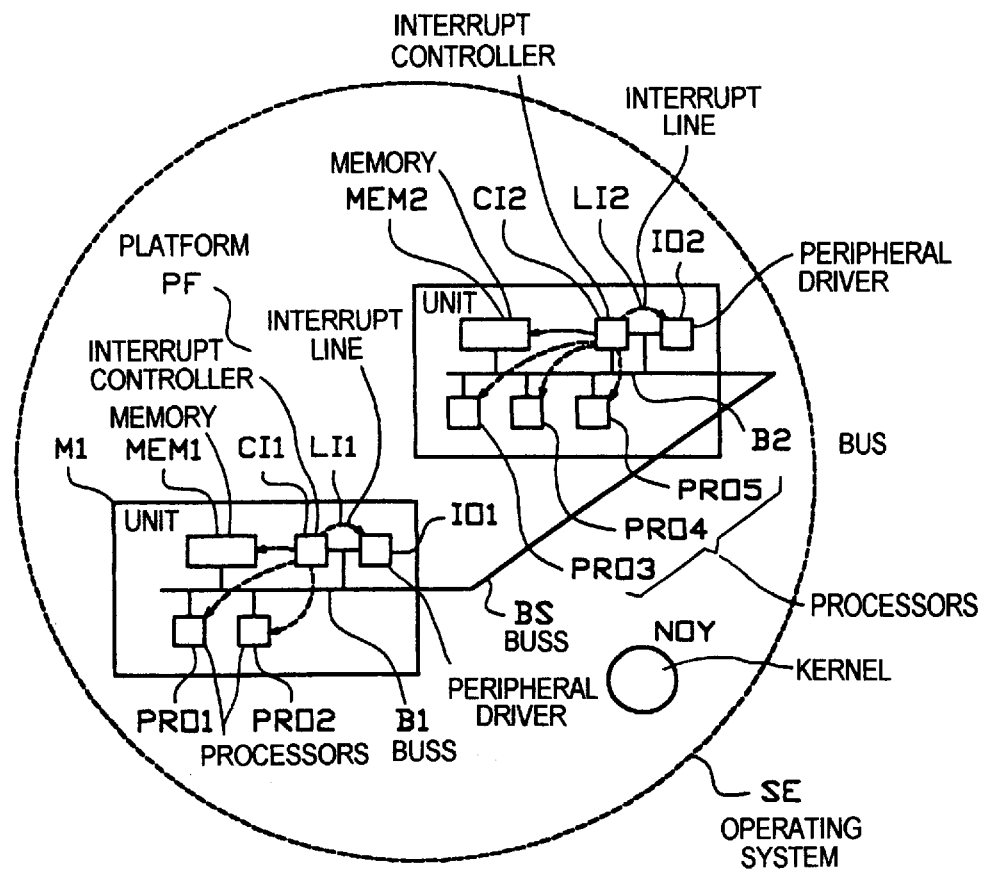
FIG. 1 is a partial schematic view illustrating the architecture of a known platform to which the process according to the invention may be applied.

FIG. 1 represents an example of a platform PF to which the invention may be applied. In the example illustrated, the platform PF has two units M1 and M2. The number of units is not limited to two, and can be any number. A unit generally comprises both physical and logical resources. For purposes of simplification, the term resources will be used to designate both of these resource types. A unit, for example M1, comprises at least one processor PRO1 and PRO2, at least one memory MEM1, and at least one interrupt controller CI1. In the example illustrated, the unit M1 comprises only one interrupt controller CI1. The unit M1 comprises resources associated with peripheral drivers marked IO1 in the drawing, such as expansion boards or auxiliary circuits. Likewise, the unit M2 comprises at least one processor PRO3, PRO4 and PRO5, at least one memory MEM2 and at least one interrupt controller. In the example illustrated, the unit M2 comprises only one interrupt controller CI2. In the example illustrated, the unit M2 comprises resources associated with peripheral drivers marked IO2.

In one unit, for example the unit M1, the various resources are connected through a bus. In the example illustrated, a bus B1 connects the various peripheral resources to the interrupt controller CI1. Another bus connects the interrupt controller CI1 to the processors PRO1 and PRO2 and to the memory MEM1. Likewise, a bus B2 connects the various peripheral resources of the unit M2 to the interrupt controller CI2. Another bus connects the interrupt controller CI2 to the processors PRO3, PRO4 and PRO5 and to the memory MEM2. Interrupt lines LI1 and LI2 connect the respective interrupt controllers CI1 and CI2 to the various resources. The units are connected to one another through a bus BS called the system bus. The transfer of data between the various units takes place through this bus BS.

The controllers CI1 and CI2 handle only one interruption at a time. The controllers CI1 and CI2 order and deliver the interruptions to a processor in a way known to one skilled to the art, as a function of the level of the interruption to be handled. The level of an interruption is a function of the priority assigned to a resource during the initialization. It therefore manages the priorities of the various interruptions (also called interrupt levels) emanating from the peripheral drivers.

An operating system SE is common to the entire platform. This operating system includes a basic kernel NOY responsible for the management of interruptions in the platform PF. Furthermore, the operating system SE makes it possible to load extension modules external to the kernel, such as extension kernels. The operating system SE is, for example, an operating system of the UNIX "modern version" type. In the platform, the interrupts are both hardware and software types, known to one skilled in the art. Software interrupts are triggered by the programs when they need to perform, for example, a memory management function. The function called is considered by the processor to be a subroutine that, once finished, returns control to the caller. Hardware and software interrupts are handled in the same way; only the type of call distinguishes them. In a software interrupt, it is the program that sets the number of interrupts, whereas in a hardware interrupt, it is the peripheral itself that handles that.

Figure 2:
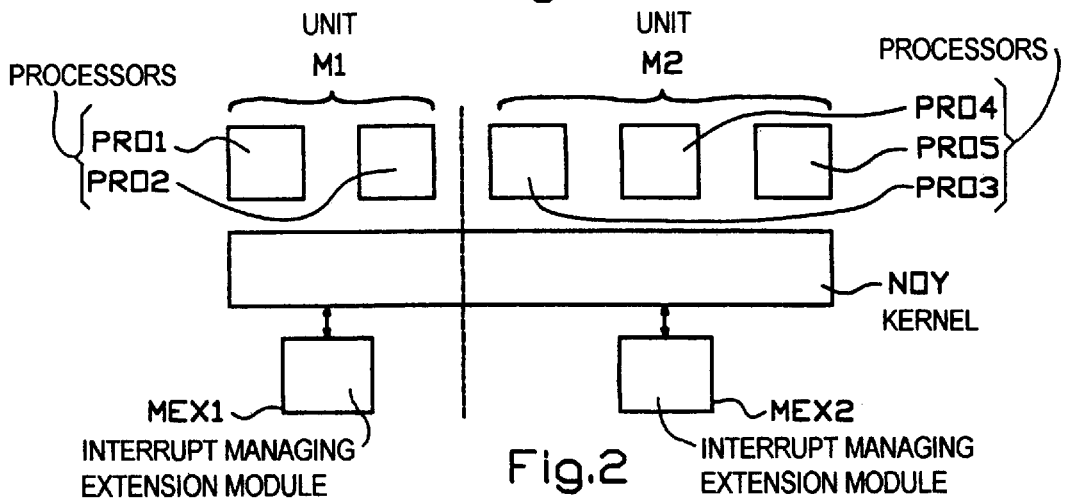
FIG. 2 is a partial schematic view that serves to illustrate the process according to the invention, the view including interrupt managing extension modules used by the process.

In FIG. 2, the basic kernel NOY illustrated is common to all the units of the platform PF, in this case M1 and M2. In the example illustrated, the unit M1 comprises two processors and is linked to the basic kernel NOY. Likewise, the unit M2 comprises three processors and is linked to the same basic kernel NOY.

The problem is the very close link that exists between the management of the interruptions and the kernel of the operating system. This link requires a complete recompilation of the basic kernel NOY with each update of the platform. An update can be the addition of a unit or the deletion of a unit in the platform. An update also includes a modification of the configuration of a unit, for example M1.

For this reason, the process of the invention consists of creating at least one interrupt managing extension module MEX1 and MEX2 external to the basic kernel in order to relieve the basic kernel NOY of the management of interruptions. These modules are therefore programs.

The process consists, for example, of associating at least one respective unit M1 and M2 with each interrupt managing extension module MEX1 and MEX2.

The choice of the number of extension modules is above all a function of the type of configuration of the platform. Generally, it distinguishes between "smallscale" and "large-scale" configurations. A "small-scale" configuration designates, for example, a configuration with a small number of units. On the other hand, "large-scale" configurations can comprise a large number of units.

According to a first variant, the platform can be of the "large-scale" configuration type. In this type of configuration, for the reasons mentioned in the introduction to the specification, the performance of the processors suffers. It is therefore desirable to associate as few units as possible with an extension module. In the example illustrated, each unit is associated with one extension module and therefore provides each unit with local interrupt management. In the example illustrated, the units M1 and M2 are associated with the respective extension modules MEX1 and MEX2.

According to another variant, the platform can be of the "small-scale" configuration type, in which the performance of the processors is not a determining factor. The process can preferably consist in the creation of only one interrupt managing extension module external to the basic kernel of the operating system. In this example, all the units are managed by means of this one module.

The process of the invention therefore consists of recompiling only the extension module with each update. In a "large-scale" configuration, the compilation involves only the extension module associated with a unit in which a modification of the configuration has been performed. In a "small-scale" configuration, the compilation involves only the one extension module.

Each extension module preferably has a management structure and authorizes the utilization of either a software or hardware management model. Both the software model and the hardware model involve the use of two hierarchical software mechanisms: a main mechanism and a secondary mechanism.

For a software management model, the main mechanism is responsible for storing an interrupt request and determines the priority associated with this interruption, which one skilled in the art most often calls the interrupt level. For this purpose, for example, the main mechanism establishes a table containing the interrupt types and the associated priorities. This model is based on a deferred management of interruptions. In effect, the main mechanism triggers the secondary mechanism once the system is available, i.e., when the system has performed all the tasks that have a higher priority than the priority level of the interrupt in question. The tasks can be a write operation, a read operation, etc.

For a hardware management model, the main mechanism manages the interrupt controller, for example CI1. The secondary mechanism is triggered directly after the second-level mechanism.

Figure 3:
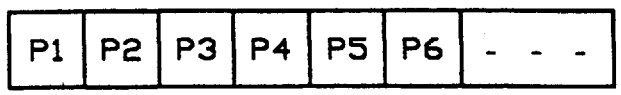
FIG. 3 is a schematic view of the parameters included in each extension module represented in FIG. 2.

In the initialization (boot) phase, i.e., at the system startup, it is necessary for the basic kernel to know the addresses of the management functions it will have to use. FIG. 3 is a schematic view of the parameters that characterize the new services offered by the platform and contained in the interrupt managing extension module. A processor, for example PRO1, is associated with an indexed table of pointers, commonly called an interrupt vector, which the processor will consult in response to an interruption. This table includes the address of the interrupt procedure associated with the interrupt request. First of all, the basic kernel NOY must export a function responsible for performing the entry of the new services offered by the interrupt managing extension module, for example MEX1. In the example illustrated, it consists of inserting these new services into the table. This function can include six parameters, as illustrated, which serve as interfaces between the basic kernel and the interrupt managing extension module. The number of parameters is can be expanded beyond six parameters in order to cover potential functionalities. The set of six parameters is associated with a peripheral driver, which is itself associated with an interrupt level.

The first parameter P1 describes the address of a function that allows the peripheral drivers to enter the addresses of their own interrupt management routines. For this purpose, two sub-parameters are used. A first sub-parameter makes it possible to identify the interrupt that the mechanism will handle. A second sub-parameter makes it possible to identify the peripheral driver itself so that it can be called. This function makes use of the internal management structure of the interrupt managing extension module, for example MEX1. This management structure can exist in the form of a table or a chain or a combination of the two, and makes it possible to store the interruptions that have not yet been processed. In concrete terms, the interrupt controller, for example CI1, sends an interrupt in the direction of the processor PRO1. The processor PRO1 is interrupted at a given interrupt level. At this interrupt level, it has a function file that is located in storage at given addresses, which it must call. These addresses correspond to interrupt routines associated with peripheral drivers. The processor calls all these functions in cascaded fashion.

The second parameter P2 describes the address of a function that makes it possible to cancel the preceding entry. If it is decided to use a new peripheral driver, this function removes from the above table the address of the corresponding interrupt routine. The contents of the address table can therefore vary. The table is not permanently set.

The third parameter P3 is similar to the first parameter P1 and describes the address of a function that allows the peripheral drivers to enter the addresses of the exception routines in case of a cutoff of the power supply. In effect, a failure of this type prevents the complete performance of a task such as a write or read operation on a disk of the platform. The parameter P2 therefore corresponds in storage to the address of a routine for warning the peripheral that the last transfer performed is not valid. The peripheral must not under any circumstances accept this transfer, in order to prevent the disk system from being inconsistent.

The fourth parameter P4 describes the address of a function that makes it possible to simulate, using software, the occurrence of an external interruption. This simulation function presents the interrupt managing extension module with a situation identical to that encountered when a true external interruption is received. This function performs an operation identical to the one that would have been performed if the interrupt level had been that of a hardware interruption sent by a coupler. The term coupler refers to the hardware circuit board that forms the link between a peripheral resource and a processor. This function can allow the testing of a piece of software. This function makes it possible to avoid having to wait for a true interruption to occur in order to test the software specific to the invention. Preferably, this function is used to test the previously compiled program in order to detect any logical errors in it.

The fifth parameter P5 describes the address of the main interrupt managing mechanism. The main mechanism is called by the kernel when the interruption occurs. The parameter used makes it possible to identify the processor. The parameter also makes it possible to identify the associated unit in the case where the platform comprises more than one unit.

In the case of a hardware management model, the function associated with this parameter merely calls the peripheral drivers whose addresses appear in the internal management structure.

In the case of a software management model, the function enters the fact that there has been an interruption into the internal management structure. In addition, this function indicates to the basic kernel, by means of the exported function, when an interrupt is waiting to be processed. The indication of the priority of the interrupt is provided in this function at this time. In both cases, this function is also in charge of acknowledging the interruption at the level of the interrupt logic.

A sixth parameter P6 describes the address of the secondary interrupt managing mechanism. This function is not called in the case of a hardware management model, the secondary mechanism being triggered directly after the processing of the interrupt by the main mechanism. This function is called in the case of a software management model. It calls this function if the priority indicated is higher than that currently being processed.

Generally, it may be said that the subject of the invention is a process for managing interruptions in a computer platform PF comprising at least one unit M1 and M2, each including at least one respective processor PRO1–PRO2 and PRO3–PRO5 and at least one respective interrupt controller CI1 and CI2, and an operating system SE including a basic kernel NOY and making it possible to create extension modules external to said basic kernel, characterized in that it consists of creating at least one interrupt managing extension module MEX1 and MEX2 external to the basic kernel NOY in order to relieve the basic kernel of the management of interruptions.

In particular, owing to the process, if the configuration of the platform PF is modified during an update, only the extension module associated with the unit that has been modified needs be recompiled. The update can consist of modifying the configuration of a unit M1 and/or M2 or even of adding to or modifying the number of units in the platform PF.

Preferably, a certain number of parameters define the new services offered by the platform PF after an update. The process therefore consists, at the initialization, for the basic kernel NOY, of exporting a function into the extension module MEX1 and MEX2 for entering into its tables the addresses of the management functions it will have to use.

In one example, we have seen that the process can consist of associating at least one respective unit M1 and M2 with each interrupt managing extension module MEX1 and MEX2. In another example, we have seen that the process can consist in the creation of only one interrupt managing extension module common to the entire platform PF.

The process of the invention also preferably consists, for the extension module, of using either a software or hardware interrupt management model.

The result is a computer platform PF comprising at least one unit M1 and M2 including at least one respective processor PRO1–PRO2 and PRO3–PRO5 and at least one respective interrupt controller CI1 and CI2, said platform PF including an operating system SE that makes it possible to create extension modules and interrupt lines LI connecting the resources to the interrupt controllers CI1 and CI2, characterized in that it comprises at least one interrupt managing software extension module for implementing the process. In one example, the interrupt lines LI connect a controller CI and CI2 of a respective unit M1 and M2 to all the resources of this same unit.

Also, it is clear from the examples illustrated that the invention offers many advantages. It solves the problem tied to the constant evolution of the current platforms. The invention provides an interrupt management interface adaptable to new platforms. This interface is provided by at least one interrupt managing extension module. This new interface does not require any compilation of the basic kernel of the operating system in response to a modification of the architecture of the platform. Another advantage of the invention is the creation of an interface compatible with the existing systems. The existing platforms can retain their basic kernels and a fortiori their interrupt management systems. Also, particularly in "large-scale" configurations, the invention improves the performance of the processors relative to the current interrupt management systems due to the fact that the management of interruptions is exported in each unit. According to another variant, the system may comprise only one interrupt managing extension module. This variant can be entirely suitable for "small-scale" platforms wherein the desired object is not to improve in the performance of the processors. And finally, one last advantage of the invention is the considerable reduction in the monetary cost caused by the addition or deletion of a unit in a platform. In fact, a modification of the configuration does not require a recompilation of the basic kernel of the operating system, but simply a compilation of the interrupt managing extension module.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. A computer platform comprising:
   at least two units, each including at least one processor and at least one interrupt controller;
   an operating system having only one basic kernal common to said at least two units and adapted to create an extension module for each of the units; and
   at least one interrupt line connecting resources to the at least one interrupt controller,
   wherein the extension modules are external to the basic kernal and are configured to provide each unit with local interrupt management.

2. A process for managing interruptions in a computer platform including at least two units, each including at least one respective processor and at least one interrupt controller, and an operating system including only one basic kernel common to the at least two units, said process comprising creating for each of the units at least one interrupt extension module external to the basic kernel for managing local interrupts in each unit.

3. A process according to claim 2, further comprising recompiling only the extension module associated with a unit of the at least two units when the unit is modified when configuration of the platform is modified during an update.

4. A process according to claim 2, further comprising modifying the configuration of a unit of the at least two units for an update.

5. A process according to claim 2, further comprising adding to or modifying the number of units in the platform for an update.

6. A process according to claim 2, further comprising, at initialization, exporting for the basic kernel a function into each of the extension modules for entering into tables of the extension module addresses of management function to be used by the extension modules.

7. A process according to claim 2, further comprising using a software interrupt management model for the extension modules.

8. A process according to claim 2, further comprising using a hardware interrupt management model for extension modules.

9. A process according to claim 2, further comprising using software and hardware interrupt management models for the extension modules.

* * * * *

UNITED STATES PATENT AND TRADEMARK OFFICE
CERTIFICATE OF CORRECTION

PATENT NO.   : 6,539,436 B2
DATED        : March 25, 2003
INVENTOR(S)  : Garrigues et al.

It is certified that error appears in the above-identified patent and that said Letters Patent is hereby corrected as shown below:

Column 8,
Line 26, delete "kemal" and substitute with -- kernel --;

Signed and Sealed this

First Day of July, 2003

JAMES E. ROGAN
*Director of the United States Patent and Trademark Office*